United States Patent
Weh

(10) Patent No.: US 12,269,446 B2
(45) Date of Patent: Apr. 8, 2025

(54) HYDRAULIC BLOCK FOR A HYDRAULIC UNIT OF A HYDRAULIC VEHICLE BRAKING SYSTEM

(71) Applicant: Robert Bosch GmbH, Stuttgart (DE)

(72) Inventor: Andreas Weh, Sulzberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 423 days.

(21) Appl. No.: 17/631,841

(22) PCT Filed: May 26, 2020

(86) PCT No.: PCT/EP2020/064484
§ 371 (c)(1),
(2) Date: Jan. 31, 2022

(87) PCT Pub. No.: WO2021/032330
PCT Pub. Date: Feb. 25, 2021

(65) Prior Publication Data
US 2022/0274578 A1   Sep. 1, 2022

(30) Foreign Application Priority Data
Aug. 19, 2019   (DE) ................. 10 2019 212 356.2

(51) Int. Cl.
*B60T 13/74*   (2006.01)
*B60T 8/36*   (2006.01)
(Continued)

(52) U.S. Cl.
CPC ............ *B60T 13/745* (2013.01); *B60T 8/368* (2013.01); *B60T 13/662* (2013.01);
(Continued)

(58) Field of Classification Search
CPC ...... B60T 13/745; B60T 13/14; B60T 13/686; B60T 8/368; B60T 13/662; B60T 15/00;
(Continued)

(56) References Cited

U.S. PATENT DOCUMENTS 2,152,485 A   3/1939   Kindl
4,445,334 A   5/1984   Derrick
(Continued)

FOREIGN PATENT DOCUMENTS

CN   106458178 A   2/2017
CN   107000717 A   8/2017
(Continued)

OTHER PUBLICATIONS

Translation of Japanese Patent No. JPS 57-170355 obtained from website: https://worldwide.espacenet.com on Mar. 18, 2024.*
(Continued)

*Primary Examiner* — Pamela Rodriguez
(74) *Attorney, Agent, or Firm* — NORTON ROSE FULBRIGHT US LLP; Gerard A. Messina

(57) ABSTRACT

A hydraulic block for a hydraulic unit of a hydraulic power vehicle braking system that includes a slip control. The hydraulic block includes in an upper side a plug connection for a connecting nipple of a brake fluid reservoir. A check valve is integrated into the plug connection.

8 Claims, 2 Drawing Sheets

(51) Int. Cl.
  *B60T 13/66* (2006.01)
  *B60T 13/68* (2006.01)
(52) U.S. Cl.
  CPC ....... *B60T 13/686* (2013.01); *B60Y 2400/306* (2013.01); *B60Y 2400/81* (2013.01)
(58) Field of Classification Search
  CPC ............ B60T 15/028; B60Y 2400/306; B60Y 2400/81
  See application file for complete search history.

(56) References Cited

U.S. PATENT DOCUMENTS

| | | | | |
|---|---|---|---|---|
| 4,736,768 | A | * | 4/1988 | Tsubouchi .......... F16K 17/0433 137/533.13 |
| 4,773,224 | A | * | 9/1988 | Sakamoto ............. B60T 11/232 60/585 |
| 4,951,470 | A | | 4/1990 | Reinartz et al. |
| 5,590,936 | A | | 1/1997 | Reuter |
| 10,053,073 | B2 | * | 8/2018 | Weh ........................ B60T 8/409 |
| 10,730,493 | B2 | * | 8/2020 | Weh ........................ B60T 8/341 |
| 2017/0106846 | A1 | | 4/2017 | Kim et al. |

FOREIGN PATENT DOCUMENTS

| | | |
|---|---|---|
| DE | 102010040380 A1 | 3/2012 |
| DE | 102012219054 A1 | 4/2014 |
| DE | 102014215076 A1 | 2/2016 |
| DE | 102016202113 A1 | 8/2017 |
| DE | 102016206785 A1 | 10/2017 |
| DE | 102017216001 A1 | 3/2019 |
| JP | S57143560 U | 9/1982 |
| JP | S57170355 U | 10/1982 |
| JP | S5947565 U | 3/1984 |
| JP | S641051 U | 1/1989 |
| JP | H09290718 A | 11/1997 |
| WO | 2019145820 A1 | 8/2019 |

OTHER PUBLICATIONS

International Search Report for PCT/EP2020/064484, Issued Jul. 21, 2020.

* cited by examiner

HYDRAULIC BLOCK FOR A HYDRAULIC UNIT OF A HYDRAULIC VEHICLE BRAKING SYSTEM

FIELD

The present invention relates to a hydraulic block for a hydraulic unit of a hydraulic vehicle braking system.

BACKGROUND INFORMATION

German Patent Application No. DE 10 2016 202 113 A1 describes a cube-shaped hydraulic block for a hydraulic unit of a slip-controlled, hydraulic power vehicle braking system including a main brake cylinder bore, a power cylinder bore, a receptacle for a pedal travel simulator and receptacles for solenoid valves, check valves and further components for brake pressure control and for slip control. One side of the hydraulic block, referred to here as the upper side, is provided for attaching a brake fluid reservoir, as is also conventional with main brake cylinders. It includes blind holes for inserting connecting nipples of the brake fluid reservoir.

SUMMARY

A hydraulic block according to an example embodiment of the present invention is provided for a hydraulic unit of a hydraulic power vehicle braking system, which includes, in particular, a slip control. A main component of hydraulic power vehicle braking systems that include a slip control is a hydraulic unit including a hydraulic block to which hydraulic wheel brakes of the vehicle braking system are connected via brake lines. Slip controls are, in particular, anti-lock braking systems, traction control systems and/or dynamic stability controls/electronic stability programs, for which the abbreviations ABS, ASR and/or DSC/ESP are common. The latter are also referred to colloquial as "anti-skid controls." Slip controls are conventional and are not further elaborated here.

The hydraulic block may include a main brake cylinder bore, in which one or multiple pistons, two pistons for a dual circuit vehicle braking system, are received, which are displaceable in the main brake cylinder bore for a muscle actuation or power-assisted actuation of the vehicle braking system using a (foot) brake pedal or a (hand) brake lever.

If the hydraulic block includes no main brake cylinder bore, it is connectable, in particular, via brake lines, for example, to a main brake cylinder.

If the hydraulic block includes a main brake cylinder bore, it preferably also includes a receptacle for a pedal travel simulator. The pedal travel simulator includes a cylindrical blind hole in the hydraulic block, which is sealable with a cylindrical bowl-shaped cylinder cover in a pressure-resistant manner and which, together with the blind hole, forms a simulator cylinder, in which a, for example, spring-biased or gas pressure-biased simulator piston is displaceable. The simulator cylinder is attached to the main brake cylinder preferably via a solenoid valve, which may also be referred to as a simulator valve, and is used to receive brake fluid from the main brake cylinder when the main brake cylinder is hydraulically separated from the vehicle braking system during a power actuation of the vehicle braking system by closing a separating valve, so that no brake fluid is able to be displaced from the main brake cylinder into the vehicle braking system.

For a power actuation of a hydraulic power vehicle braking system, the hydraulic block according to the present invention includes a power cylinder bore, in which a piston of a power brake pressure generator is accommodated, which is displaceable via, for example, a helical gear in the power cylinder bore, for generating power brake pressure with an electric motor situated preferably on the outside of the hydraulic block. The electric motor, the helical gear, the piston and the power cylinder bore form a power brake pressure generator. The piston of the power brake pressure generator is also often referred to as a plunger piston. For the present invention, the power brake pressure generator, i.e., the power cylinder bore, is not necessarily but preferably present in the hydraulic block.

The hydraulic block according to an example embodiment of the present invention is used to mechanically fasten and to hydraulically interconnect hydraulic components of the vehicle braking system or of its slip control. Such hydraulic components are, among other things, solenoid valves, check valves, hydraulic accumulators, damper chambers, pressure sensors. The main brake cylinder, the pedal travel simulator and the power brake pressure generator are—if present—also components of the vehicle braking system or of its slip control.

The hydraulic components are fastened in receptacles in the hydraulic block, which are usually designed as cylindrical through-openings or blind holes, including in part with diameter gradations. "Interconnected" means that the receptacles or the hydraulic components fastened in them are connected by lines in the hydraulic block in accordance with a hydraulic circuit diagram of the vehicle braking system or of its slip control. The lines are typically drilled in the hydraulic block.

Fitted with the hydraulic components of the vehicle braking system or of its slip control, the hydraulic block forms a hydraulic unit, "fitted" meaning that the hydraulic components are fastened in the receptacles respectively provided for them.

In one side referred to here as the upper side, the hydraulic block according to an example embodiment of the present invention includes a hole as a plug connection for a connecting nipple of a brake fluid reservoir attachable at the upper side of the hydraulic block. The hydraulic block may also include multiple holes in parallel to one another as plug connections for multiple connecting nipples of the brake fluid reservoir. The hole is, in particular, a blind hole and/or a graded diameter hole, into which one or multiple lines in the hydraulic block enter for connecting the brake fluid reservoir with, for example, the main brake cylinder bore and/or the power cylinder bore.

The connecting nipple is a tubular extension, which protrudes from an underside of the brake fluid reservoir. Multiple connecting nipples protrude in parallel to one another from the underside of the brake fluid reservoir.

For connecting to the vehicle braking system, the brake fluid reservoir is inserted with its connecting nipple into the hole forming the plug connection or with its connecting nipples into the holes forming the plug connections in the upper side of the hydraulic block, in which it/they is/are sealed, for example, with a seal. The plug connection in the upper side of the hydraulic block forms a coupling of a (brake) fluid conducting plug connection, into which the connecting nipple of the brake fluid reservoir is insertable as a plug.

According to an example embodiment of the present invention, a check valve is situated in the plug connection for the connecting nipple of the brake fluid reservoir, which is located in one preferred embodiment of the present invention at least partially within the connecting nipple when the connecting nipple is inserted in the intended manner into the plug connection.

The check valve may be fastened in the plug connection of the hydraulic block with so-called "self-clinch" technology. This involves a self-caulking by force-fitting the check valve into the connection, the material of the hydraulic block enclosing the valve being plastically formed by the check valve in such a way that the check valve is held and preferably also sealed in the connection of the hydraulic block.

The present invention enables the check valve to be housed in the hydraulic block in a space-saving and streamlined manner.

Refinements and advantageous embodiments of the present invention are disclosed herein.

All features described in the description and in the figures may be implemented individually or in basically arbitrary combination in exemplary embodiments of the present invention. Embodiments of the present invention that include not all but only one or multiple features of a specific embodiment of the present invention are, in principle, possible.

BRIEF DESCRIPTION OF THE DRAWINGS

The present invention is explained in greater detail below with reference to a specific embodiment represented in the figures.

DETAILED DESCRIPTION OF EXAMPLE EMBODIMENTS

Figure 1:
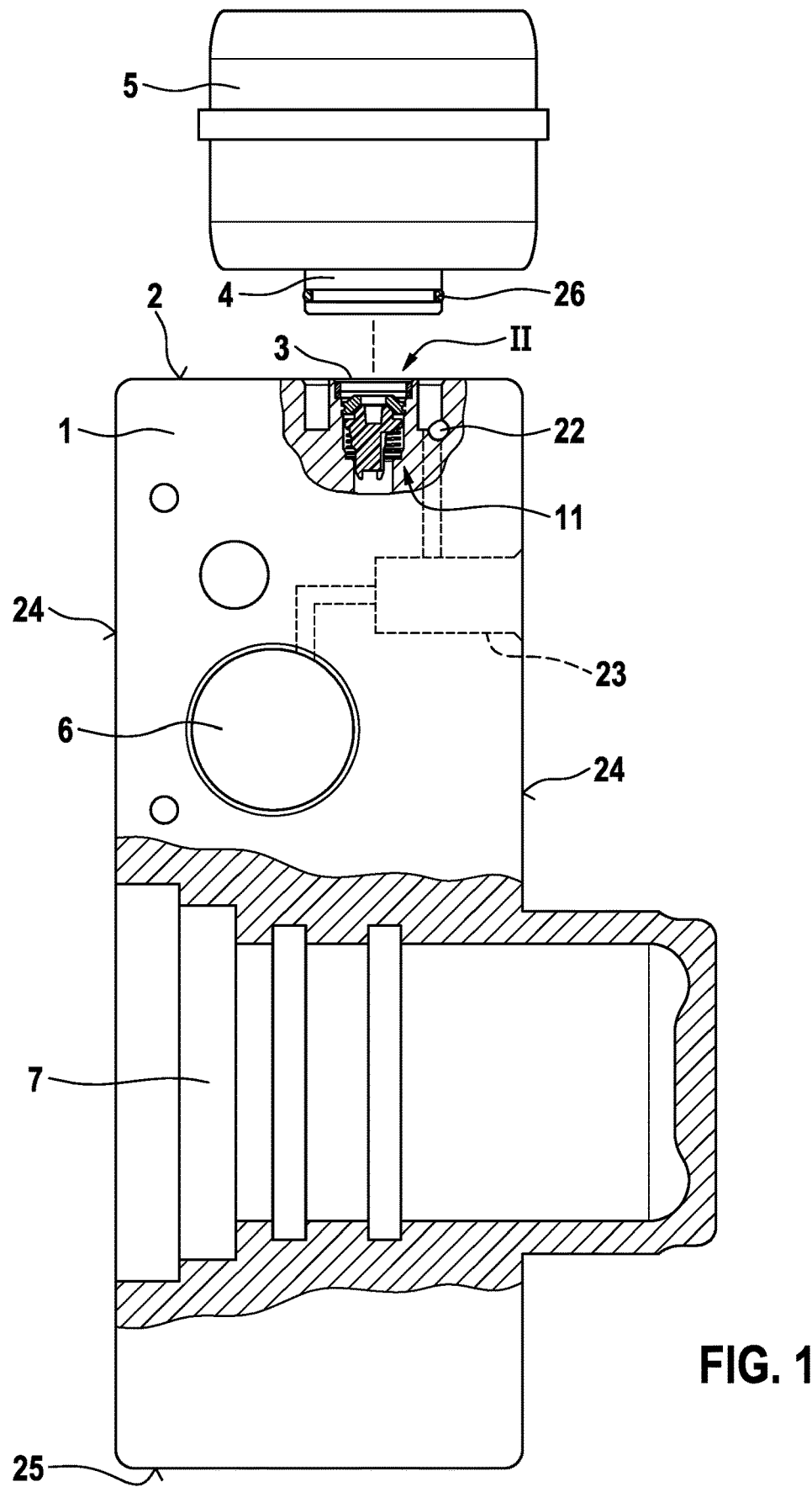
FIG. 1 shows a vertical cross section of a hydraulic block according to an example embodiment of the present invention.

Hydraulic block 1 according to the present invention represented in FIG. 1 is provided for a hydraulic unit of a hydraulic power vehicle braking system including a slip control. Such slip controls are, for example, anti-lock braking systems, traction control systems and/or dynamic stability controls/electronic stability programs, for which the abbreviations ABS, ASR and/or DSC/ESP are common. Slip controls are conventional and are not explained here.

In the exemplary embodiment, hydraulic block 1 is a narrow, cuboidal metal block, whose opposing long sides 24 are virtually square. "Narrow" means that a distance between both long sides 24 is not greater than half a length or width of the long sides. In the exemplary embodiment, the distance of the two long sides 24 from one another is approximately one-third to one-fourth the length or width of long sides 24. Other side proportions are possible.

Hydraulic block 1 serves as a mechanical fastening and hydraulic interconnection of hydraulic components of the slip control, including a brake pressure control of the power vehicle braking system. Such hydraulic components are, among other things, solenoid valves, check valves, hydraulic accumulators, damper chambers and pressure sensors, which are fastened in receptacles in the hydraulic block. The receptacles are cylindrical counter-bores, blind holes and/or also through-openings, which may include diameter gradations, and into which the hydraulic components are introduced and are fastened or become fastened in a pressure-tight manner, for example, as the result of a circumferential caulking. The hydraulic components may be countersunk in the receptacles or may project from hydraulic block 1. Fitted with the hydraulic components, hydraulic block 1 forms the hydraulic unit for brake pressure generation using external power or muscular force and for brake pressure control and slip control of the power vehicle braking system.

Hydraulic interconnection means that the receptacles for the hydraulic components are connected to one another by lines, which pass through hydraulic block 1 in accordance with a hydraulic circuit diagram of the power vehicle braking system or its slip control. A hydraulic circuit diagram of a power vehicle braking system is shown, for example, in German Patent Application No. DE 10 2016 202 113 A1. The receptacles and lines form a so-called "bore system" of hydraulic block 1, the receptacles and lines, in principle, also being capable of being produced differently than by boring.

In one side referred to here as upper side 2, hydraulic block 1 in the exemplary embodiment includes three graded diameter holes as plug connections 3 for connecting nipples 4 of a brake fluid reservoir 5. Plug connections 3 are connected by the bore system of hydraulic block 1 to, among other things, a main brake cylinder bore 6 and a power cylinder bore 7 in hydraulic block 1. In the exemplary embodiment, although not necessary for the present invention, the upper side is a narrow side of hydraulic block 1, which is provided for fastening to the top of upper side 2 at, for example, a splash board of an automobile not shown. Brake fluid reservoir 5 is fitted onto upper side 2 of hydraulic block 1 in such a way that its connecting nipples 4 extend into plug connections 3 of hydraulic block 1. Connecting nipples 4 are tubular extensions, which protrude from an underside of brake fluid reservoir 5 and which are sealed with an O-ring 26, a different sealing ring, a vulcanized seal or also by abutment of connecting nipples 4 at an inner circumference of plug connections 3. Plug connections 3 may also be understood to be couplings and connecting nipples 4 as plug (brake) fluid-conducting plug connections, by which brake fluid reservoir 5 is connected to hydraulic block 1 and to its bore system.

Figure 2:
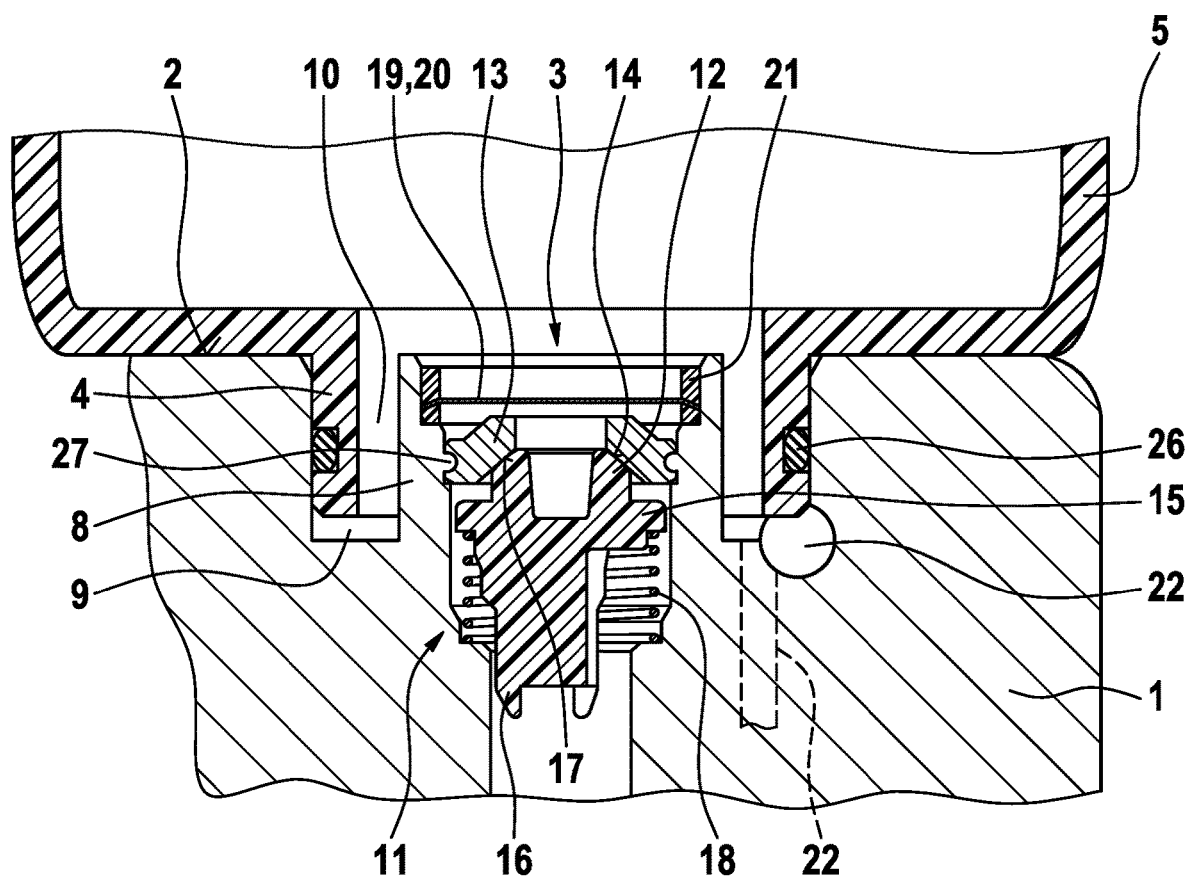
FIG. 2 shows an enlarged representation of a plug connection of the hydraulic block for a brake fluid reservoir including an integrated check valve according to arrow II in FIG. 1.

A tubular collar 8, which is surrounded by an annular space 9 in plug connection 3, is located coaxially in one of plug connections 3 (see FIG. 2). Annular space 9 is produced, for example, by a crowning cutter or core drill. Connecting nipple 4 inserted into plug connection 3 projects into annular space 9 surrounding collar 8 in plug connection 3 and, as described above, abuts with its outer circumference an inner circumference of plug connection 3 in a sealing manner, whereas an annular gap 10 exists between an inner circumference of connecting nipple 4 and collar 8, which is part of annular space 9.

A check valve 11, passable by a flow in the direction of brake fluid reservoir 5 into hydraulic block 1, is located in collar 8 of plug connection 3 (FIG. 2) for the connecting nipple 4 of the brake fluid reservoir 5. Check valve 11 includes a shut-off body 12, which interacts with valve seat member 13, both of which are situated coaxially within collar 8 in plug connection 3, shut-off body 12 being axially movable and valve seat member 13 being fixed.

Shut-off body 12 includes a coaxial ball cap-shaped or ball ring cap-shaped front face as sealing surface 14, which faces valve seat member 13. At an axial distance from sealing surface 14, shut-off body 12 includes a flange 15 for centering shut-off body 12 in plug connection 3. In the exemplary embodiment, three radiating ribs 16 situated in axial planes, which also center shut-off body 12 in plug connection 3, protrude from a side of flange 16 of shut-off body 12 of check valve 11 facing away from sealing surface 14.

Valve seat member 13 in the exemplary embodiment is a non-planar perforated disk including a coaxial truncated cone-shaped section, whose concave side faces shut-off body 12 and which forms a truncated cone-shaped valve seat 17 of check valve 11.

In the exemplary embodiment, valve seat member 13 is fastened and sealed with so-called self-clinch technology in collar 8 in plug connection 3. This involves a self-caulking when valve seat member 13 is force-fitted into collar 8, in which valve seat member 13 during force-fitting plastically deforms the surrounding material at the inside of collar 8 to form a circumferential bulge 27, which engages in a circumferential groove in the outer circumference of valve seat member 13, and holds valve seat member 13 and seals it in collar 8. Valve seat member 13 holds the other parts of check valve 11, namely shut-off body 12 and a valve spring 18 in collar 8 or in plug connection 3. Other fastenings of valve seat member 13 are possible (not shown).

Valve seat member 13 is fixedly situated at one annular step of the hole forming plug connection 3 in upper side 2 of hydraulic block 1. Shut-off body 12 is located on a side of valve seat member 13 facing away from an opening of plug connection 3 and is acted upon by a valve spring 18 with its sealing surface 14 against valve seat 17. Valve spring 18 in the exemplary embodiment is a helical compression spring, which is supported at one annular step in plug connection 3 and presses against flange 15 of shut-off body 12. Other valve springs or a springless check valve 11 are possible.

The forms of shut-off valve 12 and/or of valve seat member 13 described above are not necessary for the present invention, check valve 11 and/or shut-off body 12 may be designed differently from that described above.

A circular disk-shaped filter screen 19, which includes a circular disk-shaped filter mesh or screen 20, for example, made of metal or plastic with a washer-like frame 21, is situated in one annular step in the opening of plug connection 3.

Check valve 11 is located partly within collar 8 and connecting nipple 4 of brake fluid reservoir 5 inserted into plug connection 3 of hydraulic block 1. In the exemplary embodiment, filter screen 19, valve seat member 13 and shut-off body 12 up to approximately its flange 15 are located within collar 8 and connecting nipple 4 inserted into plug connection 3.

Annular space 9 surrounding collar 8 in plug connection 3 is intersected by a bore identified here as line 22, which extends in the direction of a tangent or of a secant of plug connection 3, and which communicates with annular gap 10 between connecting nipple 4 of brake fluid reservoir 5 and collar 8 in plug connection 3. In this way, line 22 communicates with brake fluid reservoir 5. Line 22 connects plug connection 3 for connecting nipple 4 of brake fluid reservoir 5 directly or via a further bore system of hydraulic block 1 to a receptacle 23 (FIG. 1) for a test valve (not shown), receptacle 23 for the test valve being connected via the bore system of hydraulic block 1 to main brake cylinder bore 6. The test valve is situated hydraulically between brake fluid reservoir 5 and main brake cylinder bore 6 and it is connected hydraulically in parallel to check valve 11.

The test valve is a 2/2-way solenoid valve open in its currentless initial position, through which main brake cylinder bore 6 or a main brake cylinder is connected to brake fluid reservoir 5 hydraulically in parallel to check valve 11.

Instead of tangentially or in the direction of a secant, line 22, which connects plug connection 3 to receptacle 23 for the test valve, may, for example, also open axially parallel at a base in annular space 9, which surrounds collar 8 in plug connection 3, as is drawn with dashed lines in FIG. 2.

Installed in hydraulic block 1 are above-mentioned main brake cylinder bore 6 and power cylinder bore 7 which, in the exemplary embodiment, are cylindrical through-holes including diameter gradations and circumferential grooves, which are drawn simply as cylinders.

Main brake cylinder bore 6 passes through hydraulic block 1 in parallel to upper side 2 and in parallel to the two opposing long sides 24 of hydraulic block 1 adjoining upper side 2. It is used for displaceably accommodating one or multiple main brake cylinder pistons not depicted, one of which is displaceable in main brake cylinder bore 9 as a so-called primary piston or rod piston for generating a hydraulic brake pressure mechanically using muscular force with the aid of a foot brake pedal not shown, via a piston rod also not shown, or with the aid of a hand brake lever not shown.

Power cylinder bore 7 passes through hydraulic block 1 perpendicularly to opposing long sides 24. Power cylinder bore 4 is used for displaceably accommodating a power piston not depicted of a power brake pressure generator, which is often referred to as a plunger piston. To generate a brake pressure using external power, the power piston is displaceable in power cylinder bore 7 using an electric motor not depicted, which is mounted outside at one of the two long sides 24 of hydraulic block 1 coaxially to power cylinder bore 7, via a planetary gear not shown as a mechanical reduction gear and a helical gear in the form of a ball screw drive also not shown.

Main brake cylinder bore 6 is situated between plug connection 3 and receptacle 23 for the test valve on the one hand and power cylinder bore 7 in hydraulic block 1 on the other hand. Power cylinder bore 7 is located between main brake cylinder bore 6 and an underside 25 of hydraulic block 1 opposite upper side 2 of hydraulic block 1. Main brake cylinder bore 6 is located on one side and power cylinder bore 7 on another side of a mid-plane of hydraulic block 1 at a midpoint between upper side 2 and underside 3.

What is claimed is:

1. A hydraulic block for a hydraulic unit of a hydraulic vehicle braking system, the hydraulic block comprising:
   a check valve situated in a plug connection, the plug connection being formed by a hole in an upper side of the hydraulic block and into which a connecting nipple of a brake fluid reservoir is pluggable for connection to the plug connection when the brake fluid reservoir is situated at the upper side; and
   the plug connection includes a tubular collar surrounded by an annular space that is in the plug connection and into which the connecting nipple projects when the connecting nipple is plugged into the plug connection.

2. The hydraulic block as recited in claim 1, wherein the check valve is located at least partially within the connecting nipple of the brake fluid reservoir when the connecting nipple is plugged into the plug connection.

3. The hydraulic block as recited in claim 1, wherein the check valve includes a valve spring, which is supported at an annular step in the plug connection, a valve seat member, which is situated in the plug connection, and a shut-off body, which is acted upon by the valve spring against a valve seat of the valve seat member.

4. The hydraulic block as recited in claim 1, wherein the collar is surrounded by an annular gap in the connecting nipple of the brake fluid reservoir when the connecting nipple is plugged into the plug connection.

5. The hydraulic block as recited in claim 1, wherein a line, which connects the plug connection for the brake fluid reservoir to a receptacle for a test valve and/or to a main brake cylinder bore and/or to a power cylinder bore in the hydraulic block, intersects the annular space surrounding the collar in the plug connection tangentially or in a secant direction or opens axially parallel into the annular space surrounding the collar in the plug connection.

6. The hydraulic block as recited in claim 1, wherein the annular space surrounding the collar in the plug connection is produced using a crowning cutter or core drill.

7. The hydraulic block as recited in claim 1, wherein the hydraulic block includes a main brake cylinder bore and/or a power cylinder bore.

8. A hydraulic block for a hydraulic unit of a hydraulic vehicle braking system, the hydraulic block comprising:
   a valve seat;
   a check valve that is situated in a plug connection and that is axially shiftable relative to the plug connection to thereby contact the valve seat, the plug connection being formed by a hole in an upper side of the hydraulic block and into which a connecting nipple of a brake fluid reservoir is pluggable for connection to the plug connection when the brake fluid reservoir is situated at the upper side; and
   a screen or filter that is situated stationarily in the plug connection such that the screen of filter is not axially shifted by the axial shifting of the check valve.

\* \* \* \* \*